United States Patent
Bass et al.

(10) Patent No.: US 6,654,161 B2
(45) Date of Patent: *Nov. 25, 2003

(54) DISPERSED CRYSTALLITE UP-CONVERSION DISPLAYS

(75) Inventors: Michael Bass, Orlando, FL (US); Alexandra Rapaport, Winter Park, FL (US); Hans Jennsen, Palm Harbor, FL (US)

(73) Assignee: University of Central Florida, Orlando, FL (US)

( * ) Notice: Subject to any disclaimer, the term of this patent is extended or adjusted under 35 U.S.C. 154(b) by 187 days.

This patent is subject to a terminal disclaimer.

(21) Appl. No.: 09/919,131

(22) Filed: Jul. 31, 2001

(65) Prior Publication Data

US 2002/0015218 A1 Feb. 7, 2002

Related U.S. Application Data (63) Continuation-in-part of application No. 09/448,657, filed on Nov. 24, 1999, now Pat. No. 6,327,074.
(60) Provisional application No. 60/109,837, filed on Nov. 25, 1998.

(51) Int. Cl.$^7$ .............................. G02F 1/35; G02F 2/02; G11C 13/04
(52) U.S. Cl. ...................... 359/326; 365/151; 501/123; 501/126; 501/904
(58) Field of Search ................... 359/326–332; 365/151; 501/40, 50, 64, 78, 101, 123, 126, 152, 900, 904–906; 372/6, 39–42

(56) References Cited

U.S. PATENT DOCUMENTS

| | | | | |
|---|---|---|---|---|
| 5,684,621 A | * | 11/1997 | Downing | 359/326 |
| 5,746,942 A | | 5/1998 | Bowman et al. | 252/301.4 H |
| 5,764,403 A | * | 6/1998 | Downing | 359/326 |
| 5,786,102 A | | 7/1998 | Paz-Pujalt et al. | 428/689 |
| 5,914,807 A | * | 6/1999 | Downing | 359/326 |
| 5,943,160 A | * | 8/1999 | Downing | 359/326 |
| 5,956,172 A | * | 9/1999 | Downing | 359/326 |
| 6,028,977 A | | 2/2000 | Newsome | 385/147 |
| 6,128,131 A | | 10/2000 | Tang | 359/443 |
| 6,327,074 B1 | * | 12/2001 | Bass et al. | 359/326 |

OTHER PUBLICATIONS

Alexander A. Kaminskii, *Laser Crystals*, vol. 14, p. 170–311, Springer Series in Optical Science, 1981.

* cited by examiner

*Primary Examiner*—John D. Lee
(74) *Attorney, Agent, or Firm*—Brian S. Steinberger; Law Offices of Brian S. Steinberger, P. A.

(57) ABSTRACT

A two and three dimensional display based on up conversion of near infrared light to the visible. The display medium is a transparent polymer containing particles of crystals doped with $Yb^{3+}$ and other rare earth ions. The $Yb^{3+}$ ions absorb light from a commercially available diode laser emitting near 975 nm and transfer that energy to the other dopant ions. Using a fluoride crystal host, $NaYF_4$, co-doped with $Tm^{3+}$ ions we obtain blue light at ~480 nm, with $Ho^{3+}$ or $Er^{3+}$ ions we obtain green light at ~550 nm and with $Er^{3+}$ we obtain red light at ~660 nm. The display medium is also used with a preferred component layout with experimentation test data, along with applications for full color, high brightness, high resolution, displays.

32 Claims, 9 Drawing Sheets

DISPERSED CRYSTALLITE UP-CONVERSION DISPLAYS

This invention relates to displays, and in particular to using single crystal, crystallites in passive hosts that can be excited to emit visible light upon for use in two and three dimensional luminescent displays, and the invention is a Continuation-In-Part of U.S. application Ser. No. 09/448,657 filed Nov. 24, 1999, now U.S. Pat. No. 6,327,074, which has the same signee as the subject invention, and a common inventor with the subject invention, and which claims the benefit of U.S. Provisional application Ser. No. 60/109,837 filed Nov. 25, 1998, and the invention was funded in part under U.S. Army Contract DAAD199910220, and this invention is related to co-pending application Ser. No. 09/919,130 filed Jul. 31, 2001 by the same assignee as the subject invention.

BACKGROUND AND PRIOR ART

Using a monochromatic display has been well known. However, monochromatic displays do not offer color adequate color type detail such as reds, greens and blue colors.

Displays using liquid crystals have been proposed of generating color displays. See for example, U.S. Pat. No. 5,359,345 and 5,724,062 to Hunter. However, these patents require arranging individual pixels in rows and corresponding columns, column 4, lines 36–39. The devices described can be expensive and complicated to manufacture, and can have a narrow angular view ranges with low brightness.

Additional display systems have been proposed with similar problems to those described above. See for example, U.S. Pat. No. 4,791,415 to Takahashi; U.S. Pat. No. 4,871,231 to Garcia, Jr.; U.S. Pat. No. 5,184,114 to Brown; U.S. Pat. No. 5,192,946 to Thompson et al.; and U.S. Pat. No. 5,317,348 to Knize.

Several patents have been proposed for panel displays using two-frequency upconversion fluorescence. See for example, U.S. Pat. Nos. 5,684,621; 5,764,403; 5,914,807; 5,943,160; and 5,956,172 all to Downing. The Downing '403 patent appears to be the most relevant to the subject invention. Downing '403 is primarily concerned with embodiments where the use of different layers for red, green and blue emitters, abstract, FIG. 6, and briefly describes some mixing of only crystal type materials in a single display media. However, for the single display media, Downing '403 uses nanometer sized particles, column 4, lines 33+, column 9, lines 42–45, which would inherently be difficult to form, handle and disperse in a display medium.

Other known patents such as U.S. Pat. No. 5,003,179 to Pollack; U.S. Pat. No. 5,051,278 to Paz-Pujalt; U.S. Pat. No. 5,154,962 to Mertens et al.; U.S. Pat. No. 5,245,623 to McFarlane; U.S. Pat. No. 5,622,807 to Cutler; U.S. Pat. No. 5,846,684 to Paz-Pujalt et al. also fail to overcome the problems with the other patents described above.

SUMMARY OF THE INVENTION

The primary objective of this invention is provide an inexpensive medium for two and three dimensional displays.

The secondary objective of this invention is to provide a transparent polymer(plastic) containing particles doped with rare ions for use as display medium for two and three dimensional displays.

The third objective of this invention is to provide a medium for the up conversion of near infrared light to the visible for two and three dimensional displays.

The invention encompasses the up conversion and diode lasers operating at approximately 970 nm to develop displays in which a scanned and modulated beam of near infrared light causes visible light to be emitted from a display medium. A preferred embodiment of a display system of the subject invention uses a two and three dimensional display without the need of a vacuum tube nor any high voltage electronics. The novel display system offers significant improvements in the areas of display safety, cost, complexity and size over prior art systems.

Although near infrared diodes are relatively simple and inexpensive, the light is, of course not visible. Red, green and blue visible laser sources are complex and expensive and produce light that an observer sees as speckled. Therefore, the subject inventors have developed a display system that employs the simplicity of the diode laser and yet yields full color, high resolution, high brightness, speckle free images. The invention demonstrates that the diode laser light can be converted into red, green and blue visible light by the mechanism of up conversion in certain crystals.

Further objects and advantages of this invention will be apparent from the following detailed description of a presently preferred embodiment which is illustrated schematically in the accompanying drawings.

DESCRIPTION OF THE PREFERRED EMBODIMENTS

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

The subject invention is related to U.S. application Ser. No. 09/448,657 filed Nov. 24, 1999, now U.S. Pat. No. 6,327,074. by the same assignee as the subject application and a common inventor with the subject application which is incorporated by reference.

Figure 1:
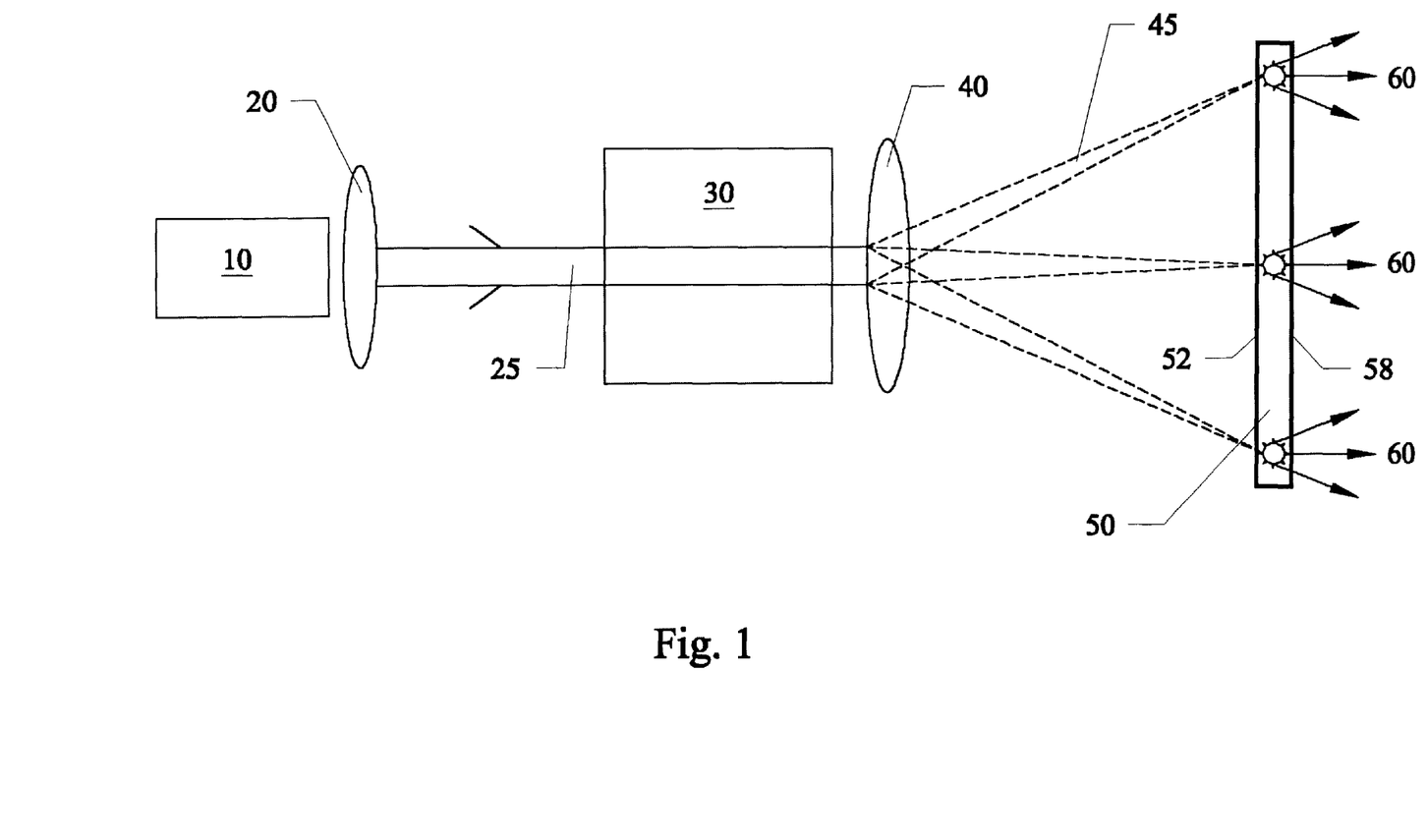
FIG. 1 shows a schematic of a preferred embodiment of the invention.

FIG. 1 shows a schematic of a preferred embodiment 1 of the invention, the components of which will now be described. Modulated diode laser 10 can be a GaAs diode laser purchased from Spectra Diode Co. and driven by a power supply that can be modulated. Lens or lens combination 20 is used to collimate the diverging light produced by the diode laser, and can be purchased by optics suppliers such as Melles Griot Co. specially designed for this purpose. Beam scanner 30 can be an acousto-optic scanner produced by NEOS Inc. or a mirror attached to a galvanometer or a rotating mirror. Lens 40 is used to bring the scanned and modulated light to focus on the display screen. Display medium 50 of phosphorylated polymethymethacrylate (p-PMMA) host contains particles that can up convert near infrared light from the diode laser and emit visible light. Coating 52 can be a thin film dielectric coating of sufficient layers and thicknesses to achieve the desired properties of reflection and transmission such as sold by Coherent Optics, Inc. Coating 58 can be a thin film dielectric coating of sufficient layers and thicknesses to achieve the desired properties of reflection and transmission such as sold by Coherent Optics, Inc. The operation of the components of FIG. 1 will now be described.

Referring to FIG. 1, diode laser 10 can be excited by an electrical current to emit near infrared light. As the current is varied so is the output power of the diode laser. This produces the modulated diode laser light. The light is then collimated by the lens or lens combination 20 so that it can be scanned by the scanner 30 to be focused by the lens 40 to the selected place on the display medium 50 where the emission of visible light is desired to create the displayed information. The scanner must produce many beams of light to produce the many spots on the display medium that emit light and form the perceived display. The coating 52 allows the diode laser light to pass and reflects any backward traveling visible light emitted by the display medium towards the observer. The coating 58 allows visible light to pass and reflects any unused the diode laser light to pass a second time through the display medium and to so increase the efficiency of the display.

Up-conversion Materials

The subject invention demonstrates that diode laser light can be converted into red, green and blue visible light by the mechanism of up conversion in certain types of crystals. Because these crystals can not be prepared in sizes as large as needed for most display applications we prepare the crystals as approximately 10 μm size particles and disperse them in a phosphorylated polymethylmethacrylate (p-PMMA) host. This results in a display medium that can be formed to any desired shape, can be transparent or not, as desired, and can be affixed to any desired substrate. Experiments have been conducted using several different rare earth ions co-doped with $Yb^{3+}$ in fluoride and orthophosphate crystalline hosts. The $Yb^{3+}$ ions absorb light in a fairly broad band near approximately 975 m in these crystals. They then can efficiently transfer the absorbed energy to levels of the co-dopant from which visible light can be emitted. This process, one in which sequential absorption of two photons of near infrared energy by donor ions which then transfer that energy to a single acceptor ion in such a manner as the acceptor can then emit visible light, is called up conversion.

Table 1 is a list of the various crystals and co dopants studied and the central wavelengths of the bands of visible emission detected following excitation with a diode laser source operating at 968 nm.

TABLE 1

Visible emission of Tm, Er and Ho after Yb excitation in different hosts

| Doping ion | | Peak emission wavelength (nm) | | |
|---|---|---|---|---|
| $Yb^{3+}$ + | Crystal host | blue | green | Red |
| $Tm^{3+}$ | $NaYF_4$ | 450, 475 | | 647, 698 |
| | KYF | 481 | | 652 |
| | YLF | 483 | | 648 |
| | $LuPO_4$ | 475 | | 649, 704 |
| $Er^{3+}$ | $NaYF_4$ | 411 | 540 | 660 |
| | KYF | | 550 | 654, 670 |
| | YLF | | 541, 549 | 654, 668 |
| | $LuPO_4$ | | 526, 550 | 657, 667 |
| $Ho^{3+}$ | $NaYF_4$ | | 540 | 648 |
| | KYF | | 544 | 658 |

In Table 1, $Yb^{3+}$ refers to ytterbium, $Tm^{3+}$ refers to thulium, $Er^{3+}$ refers to erbium, $Ho^{3+}$ refers to holmium, $NaYF_4$ refers to crystal sodium yttrium fluoride, and the supercript 3+refers to the triply ionized state of the atom. Referring again to Table 1, KYF is short for $KYF_4$ and refers to crystal, potassium yttrium fluoride. YLF is short for $YliF_4$ and refers to the crystal, yttrium lithium fluoride. $LuPO_4$ refers to the crystal, lutetium orthophosphate.

The crystals and dopants listed in Table 1 are illustrative of a few of the combinations that can be used. Other lanthanide(rare earth) atoms in the 3+state can also be used as dopants. For example, $Nd^{3+}$, $Pr^{3+}$, $Ce^{3+}$ and the like, can also be used. There can be other oxide and flouride crystals that can serve as host crystals. Transition metal dopants such as but not limited to $Cr^{3+}$, $Ti^{3+}$ and the like, can serve as dopants in these host crystals as well. Additionally, other crystals and activators that can be used for this invention can include those listed from pages 171 to page 311 listed in Laser Crystals by Alexander Kaminski,(Springer Verlag, New York) SBN 0-387-09576-4, 1981. These crystals and their activators can include but are not limited to the following described activators and crystal combinations.

Activator $Pr^{3+}$ and crystals can include: $LiYF_4$, $Ca(NbO_3)_2$, $CaWO_4$, and $SrMoO_4$.

Activator $Nd^{3+}$ and crystals can include: $LiYF_4$, $LiYO_2$, $LiNbO_3$, $LiNbP_4O_{12}$, $CaF_2$, $SrF_2$, $BaF_2$, $LaF_3$, $CeF_3$, NaF, $NaCaYF_6$, $NaCaCeF_6$, $NaNdP_4O_{12}$, $YF_3$, CaYF, SrYF, $CeO_2$, $GdF_3$, $YF_3$, $LuF_3$, $CdF_2$, $KY(MoO_4)_2$, $KY(WO_4)_2$, $KNdP_4O_{12}$, $KGd(WO_4)_2$, $CaMg_2Y_2$, $CaAl_4O_7$, $CaAl_{12}O_{19}$, $CaSc_2O_4$, $Ca_3(VO_4)_2$, $Ca(NbO_3)_2$, $CaMoO_4$, $CaWO_4$, $SrAl_2O_7$, $SrAl_{12}O_{19}$, $SrMoO_4$, $SrWO_4$, $Y_2O_3$, $YAlO_3$, $Y_3Al_5O_{12}$, $Y_2SiO_5$, $YP_5O_{14}$, $Y_3Sc_2Al_3O_{12}$, $Y_3Sc_2Ga_3O_{12}$, $YVO_4$, $Y_3Ga_5O_{12}$, $(Y, Lu)_3Al_5O_{12}$, $Ba_{0.25}Mg_{2.75}Y_2$, $LaBe_2O_5$, $La_2O_3$, $LaAlO_3$, $LaP_5O_{14}$, $LaNbO_4$, $CeP_5O_{14}$, $NdAl_3(BO_3)_4$, $NdP_5O_{14}$, $Gd_2O_3$, $GdAlO_3$, $GdP_5O_{14}$, $GdScO_3$, $Gd_3Sc_2Al_3O_{12}$, $Gd_3Sc_2Ga_3O_{12}$, $Gd_3Ga_5O_{12}$, $Gd_2(MoO_4)_3$, $LuAlO_3$, $Lu_3Ga_5O_{12}$, $PbMoO_4$, $Bi_4Si_3O_{12}$, $Bi_4Ge_3O_{12}$, $LiLa(MoO_4)_2$, Li(Nd, La)$P_4O_{12}$, Li(Nd, Gd)$P_4O_{12}$, $LiGd(MoO_4)_2$, $NaLa(MoO_4)_2$, $NaLa(WO_4)_2$, $Na_3Nd(PO_4)_2$, $Na_5Nd(WO_4)_2$, $Na_3Gd(WO_4)_2$, Na(Nd, Gd), $Ka(MoO_4)_2$, $K_3Nd(PO_4)_2$, $K_3$(Nd, La), $K_3Nd(MoO_4)_4$, $K_5Bi(MoO_4)_4$, $CaY_4(SiO_4)_3O$, $Ca_{0.25}Ba_{0.75}$, $CaLa_4(SiO_4)_3O$, $CaLa(PO_4)_3O$, $CaGd_4(SiO_4)_3O$, $YScO_3$, $Y_2Ti_2O_7$, $ZrO_2$—$Y_2O_3$, $Ba_2MgGe_2O_7$, $Ba_2ZnGe_2O_7$, $(Nd, Sc)P_5O_{14}$, $(Nd, In)P_5O_{14}$, $(Nd, La)P_5O_{14}$, $(Nd, Gd)Al_3$, $LuScO_3$, $HfO_2$—$Y_2O_3$, $Bi_4(Si, Ge)_3O_{12}$, $Ca_5(PO_4)_3F$, $Sr_5(PO_4)_3F$, and $La_2O_2S$, $CeCl_3$, $Pb_5(PO_4)_3F$.

Activator $Ho^{3+}$ and crystals can include: $LiYF_4$, $Li(Y, Er)F_4$, $LiNbO_3$, $CaF_2$, $LiHoF_4$, $BaY_2F_8$, $Ba(Y,Er)_2F_8$, $HoF_3$, $CaF_2$, $YF_3$, $ErF_3$, $NaCaErF_6$, $K(Y, Er)(WO_4)_2$, $KGd(WO_4)_2$, $Ca(NbO_3)_2$, $CaMoO_4$, $CaWO_4$, $YAlO_3$, $Y_3Al_5O_{12}$, $Y_2SiO_5$, $YVO_4$, $Y_3Fe_5O_{12}$, $Y_3Ga_5O_{12}$, $(Y, Er)Al_3$, $(Y, Er)_3Al_5O_{12}$, $LaNbO_4$, $GdAlO_3$, $Ho_3Al_5O_{12}$, $Ho_3Sc_2Al_3O_{12}$, $Ho_3Ga_5O_{12}$, $Er_2O_3$, $ErAlO_3$, $Er_2SiO_5$, $Er_3Sc_2Al_3O_{12}$, $ErVO_4$, $(Er, Tm, Yb)_3$, $(Er, Lu)AlO_3$, $Yb_3Al_5O_{12}$, $LuAlO_3$, $Lu_3Al_5O_{12}$, $NaLa(MoO_4)_2$, $CaY_4(SiO_4)_3O$, $SrY_4(SiO_4)_3O$, $SrLa_4(SiO_4)_3O$, $ZrO_2$—$Er_2O_3$, $Ba_2NaNb_5O_{15}$, and $Ca_5(PO_4)_3F$.

Activator $Er^{3+}$ and crystals can include: $LiYF_4$, $LiErF_4$, $CaF_2$, $BaY_2F_8$, $Ba(Y,Er)_2F_8$, $LaF_3$, $YF_3$, $ErF_3$, $K(Y, Er)(WO_4)_2$, $KGd(WO_4)_2$, $CaAl_4O_7$, $Ca(NbO_3)_2$, $CaWO_4$, $YAlO_3$, $Y_3Al_5O_{12}$, $(Y, Er)_3Al_5O_{12}$, $GdAlO_3$, $Er_3Al_5O_{12}$, $(Er, Lu)_3Al_5O_{12}$, $Yb_3Al_5O_{12}$, $LuAlO_3$, and $Lu_3Al_5O_{12}$.

Activator $Ni^{2+}$ and crystals can include: $MgF_2$, $MnF_2$, and MgO. Activator $V^{2+}$ and crystals can include: $MgF_2$. Activator $Co^{2+}$ and crystals can include: $MgF_2$, $KMgF_2$, and $ZnF_2$. Activator $Yb^{3+}$ and crystals can include: $CaF_2:Nd^{3+}$, $Y_3Al_5O_{12}$, $Y_3Ga_5O_{12}$, $(Y,Yb)_3Al_5O_{12}$, $Gd_3Sc_2Al_3O_{12}$, $Gd_3Ga_5O_{12}$, $(Yb, Lu)_3Al_5O_{12}$, $Lu_3Al_5O_{12}$, $Lu_3Sc_2Al_3O_{12}$, and $Lu_3Ga_5O_{12}$. Activator $Sm^{2+}$ and crystals can include: $CaF_2$, $SrF_2$. Activator $Dy^{2+}$ and crystals can include: $CaF_2$, $SrF_2$. Activator $Dy^{3+}$ and crystals can include: $Ba(Y,Er)_2F_8$. Activator $Tm^{2+}$ and crystals can include: $CaF_2$.

Activator $Tm^{3+}$ and crystals can include: $CaF_2$, $SrF_2$, $ErF_3$, $NaCaErF_6$, $LiNbO_3$, $Ca(NbO_3)_2$, $CaMoO_4$, $CaWO_4$, $YAlO_3$, $Y_3Al_5O_{12}$, $YVO_4$, $(Y, Er)Al_3$, $(Y, Er)_3Al_5O_{12}$, $GdAlO_3$, $Er_2O_3$, $ErAlO_3$, $Er_3Al_5O_{12}$, $(Er, Yb)_3Al_5O_{12}$, $(Er, Lu)AlO_3$, $Lu_3Al_5O_{12}$, and $ZrO_2$—$Er_2O_3$.

Activator $U^{3+}$ and crystals can include: $CaF_2$, $SrF_2$, and $BaF_2$. Activator $Pr^{3+}$ and crystals can include: $LaF_3$, $LaCl_3$, $LaBr_3$, $PrCl_3$, and $PrBr_3$. Activator $Cr^{3+}$ and crystals can include: $BeAl_2O_4$, $Al_2O_3$, and $Y_3Al_5O_{12}$. Activator $Eu^{3+}$ and crystals can include: $Y_2O_3$, $YVO_4$. Activator $Gd^{3+}$ and crystals can include: $Y_3Al_5O_{12}$.

Some of the dopant-host combinations can also emit useful infrared light through excitation by absorption of a single photon. This invention can also include systems that emit infrared light by this process of down-conversion(e.g. absorbing a high energy photon and emitting one of lower energy) as well as systems that are excited by such two photon processes as up-conversion(e.g. absorbing more than one low energy photons and emitting one or more higher energy photons).

Figure 2A:
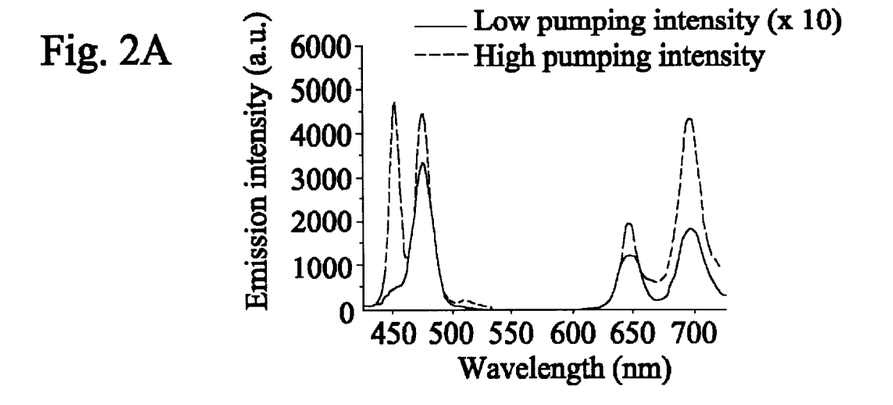
FIG. 2a shows an emission spectrum of Tm, Yb:NYF after excitation at approximately 968 nm and for different pump intensities.
Figure 2B:
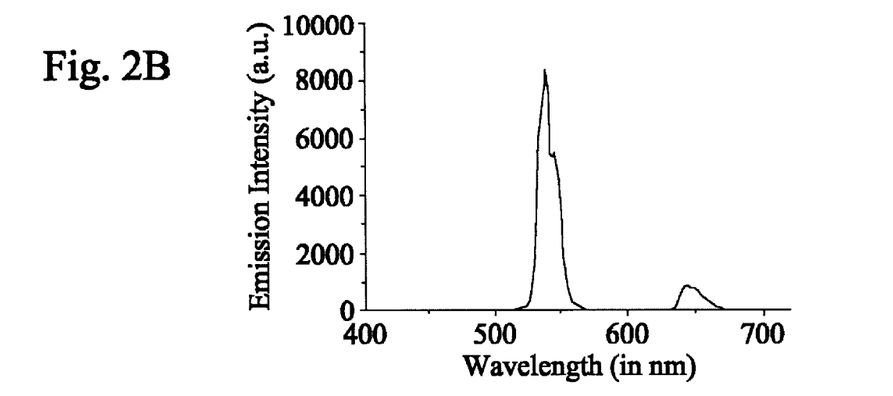
FIG. 2b shows an emission spectrum of Ho, Yb:NYF after excitation at approximately 968 nm.
Figure 2C:
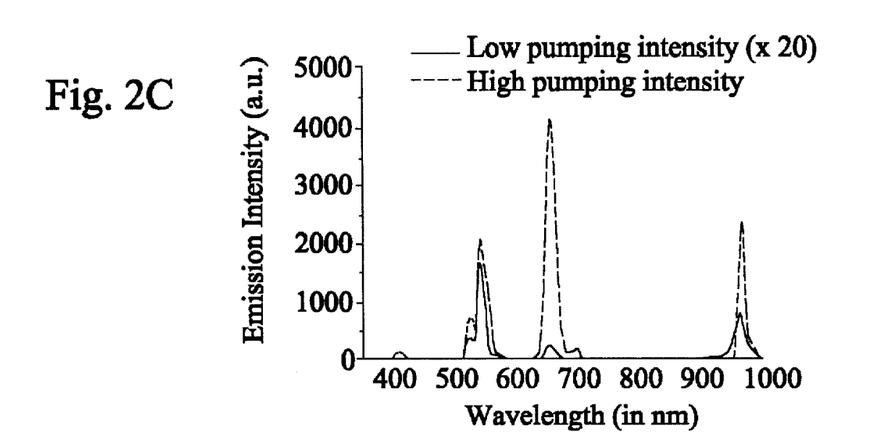
FIG. 2C shows an emission spectrum of Er, Yb:NYF after excitation at approximately 968 nm and for different pump intensities.

FIG. 2a shows the emission spectrum obtained when the crystals studied were $Yb:NaYF_4$ co doped with $Tm^{3+}$ ions, 2b with $Ho^{3+}$ ions and 2c with $Er^{3+}$ ions.

From experimentation, dispersed crystallite up conversion displays employing crystallites of the rare earth doped flouride materials Er, $Yb:NAYF_4$, $Er,Yb:KYF_4$, $Ho,Yb:NaYF_4$, and $Ho,Yb:KYF_4$ each can be used as green light emitters. Er, $Yb:NAYF_4$ and $Er,Yb:KYF_4$ can each be used as red light emitters. Tm, $Yb:NAYF_4$ and $Tb,Yb:KYF_4$ can each be used as blue light emitters. Furthermore, Tm, Yb orthophospates (for example, $YPO_4$ and $LuYPO_4$) can also be used as blue light emitters. Additionally, other flourides, crystals and glasses can also be used.

The inventors have found excellent performance results from the listed materials above. Further experimentation has shown that concentrations of the dopants in the hosts effects performance. For example, approximately 0.2% Ho, 18% Yb doped $KYF_4$ is a better green light emitter than material containing approximately 0.8% Ho.

Crystallite Sizes

From the invention, two dimensional displays can employ nano sized particle crystallites that absorb near infrared light and through the process of up-conversion convert the light into visible light. The crystallite dimensions can include dimensions of approximately 1 and 100 microns.

These crystallites can contain absorbing or donor ions of one sort and acceptor or emitting ions of another sort. Additionally, some crystallites can contain only one sort of ion that absorbs the near infrared excitation and also emits the visible light. The size of the crystallites can be between approximately 1 and approximately 100 microns depending on the dimensions of the resolution element of the display being implemented. For example, a display having 1000 resolution elements per line that is 1 m long, the resolution element is approximately 1 mm in dimension. Such a resolution element can contain several 100 micron sized crystallites. Larger sized crystallites are actually finite size single crystals. In displays requiring larger size resolution elements more 100 micron size crystallites can be used. If the resolution element is for a smaller size display(e.g. approximately 0.25 m long), the crystallite size is reduced to allow for several to fit in the now 250 micron dimension resolution element. In addition to the size limitations imposed by the size of the resolution element of the display, the obtainable brightness and efficiency of the display medium can depend on particle size. For example, nanoparticles are so small as to contain too few donor and acceptor ions to be effective. Further, very small particles tend to adhere together into ineffective clumps that also scatter light poorly.

The use of very small crystallites(e.g. nano-particles) can be appealing but so small a crystallite can contain too few absorbing and emitting ions to efficiently up-convert incident near infrared light. Crystallites of dimensions that are comparable to visible and near infrared light wavelengths will scatter both the pump and the emitted light more strongly than larger crystallites and making for inefficient displays. The size of the crystallites should be larger than the pump wavelength(approximately 1 micron) to assure that sufficient active ions are present in each and that scattering is minimal.

Crystallite Preparation

The up-converting crystallites are prepared with nearly damage free surfaces in order to be dispersed in a passive host medium. The crystallites can be formed by low grinding force grinding and can require post grinding treatment in a chemical etch to remove damaged material and any sharp edges that can lead to strong scattering of both pump and emitted light. The low grinding force would be the minimal force needed to break the crystals into small particles without crushing the particles into sub micron particles that can than agglomerate into clumps. The chemical etch treatment would include placing an item into a chemical that dissolves the outer layers of the item at a known rate so that one can remove the material from the item that has been damaged during preparation. Thus, it would be important to chemically etch the particles to remove surface layers that have been damaged by the grinding process. The types of processes would be specific to a material. For example, water will serve to chemically etch table salt crystals, and it will not affect sapphire, which would probably need a type of acid etchant.

When crystallites are prepared to be dispersed in a passive host medium it would be easy to grind the crystallites with too much force that their surfaces become severely damaged. Surface damage and interior damage can significantly alter the absorption and emission properties of the crystallite. For example, the damaged materials decrease the light emission. The damaged materials also makes the surfaces of the crystallites rough so that even when the passive host medium has the same index of refraction as the crystallites, damaged crystallites strongly scatter both pump and emitted light. It is critically important to prepare crystallites so that their surfaces remain substantially undamaged and generally represent crystalline cleavage planes which are surfaces in the crystal that are more weakly bonded to surfaces and below them than are other surfaces. Hence, when one tries to break a crystal, it breaks or cleaves along the surfaces that are weakly bonded to their neighbors.

Crystallites that are crushed too hard can also form very small, dam ged, crystallites that can agglomerate together into clumps that appear to pass off as larger crystallites. These clumps of damaged crystallites can strongly scatter both pump and visible light emissions. Additionally, these clump crystallites do not up-convert very well. The wrong polymers can also cause a clumping effect. An example of an acceptable polymer material that avoids the clumping problem is transparent polymer plastic such as phosphorylated polymethylmethacrylate(p-PPMA), and those described in related co-pending patent application Ser. No. 09/919,130 filed Jul. 31, 2001, to the same assignee as that of the subject invention.

Relationship Between Display Parameters and Performance

Dispersed crystallite up-conversion displays in which the achieved brightness and efficiency of light generation are optimized by taking advantage of the nonlinear nature of the excitation process to select focussing and scanning parameters following demonstrated scaling rules, which will be described further below.

Experimentation has demonstrated that since the excitation process in up-conversion depends on the square of excitation intensity for a two photon absorption mechanism, and on higher powers of higher numbers of photon absorption processes, the brightness of emission of visible light can depend inversely on the diameter of the excited region.

For a material in which the process is two-photon absorption, the scaling law is that brightness varies inversely with the square of the diamter of the excited region. This feature connects with the dwell time of the excitation on the emitting region and leads to a strong emphasis on properly focusing the exciting light for a given resolution element size and scan speed.

The inventors' research has also shown that the scaling rule applies differently to different materials as the transfer rate from donor to acceptor ions and the luminescence decay time enters into the display medium's performance. Rate equation computations have been performed to demonstrate the scaling rules.

Up-conversion System and Brightness and Efficiency Scaling Rules

Figure 3:
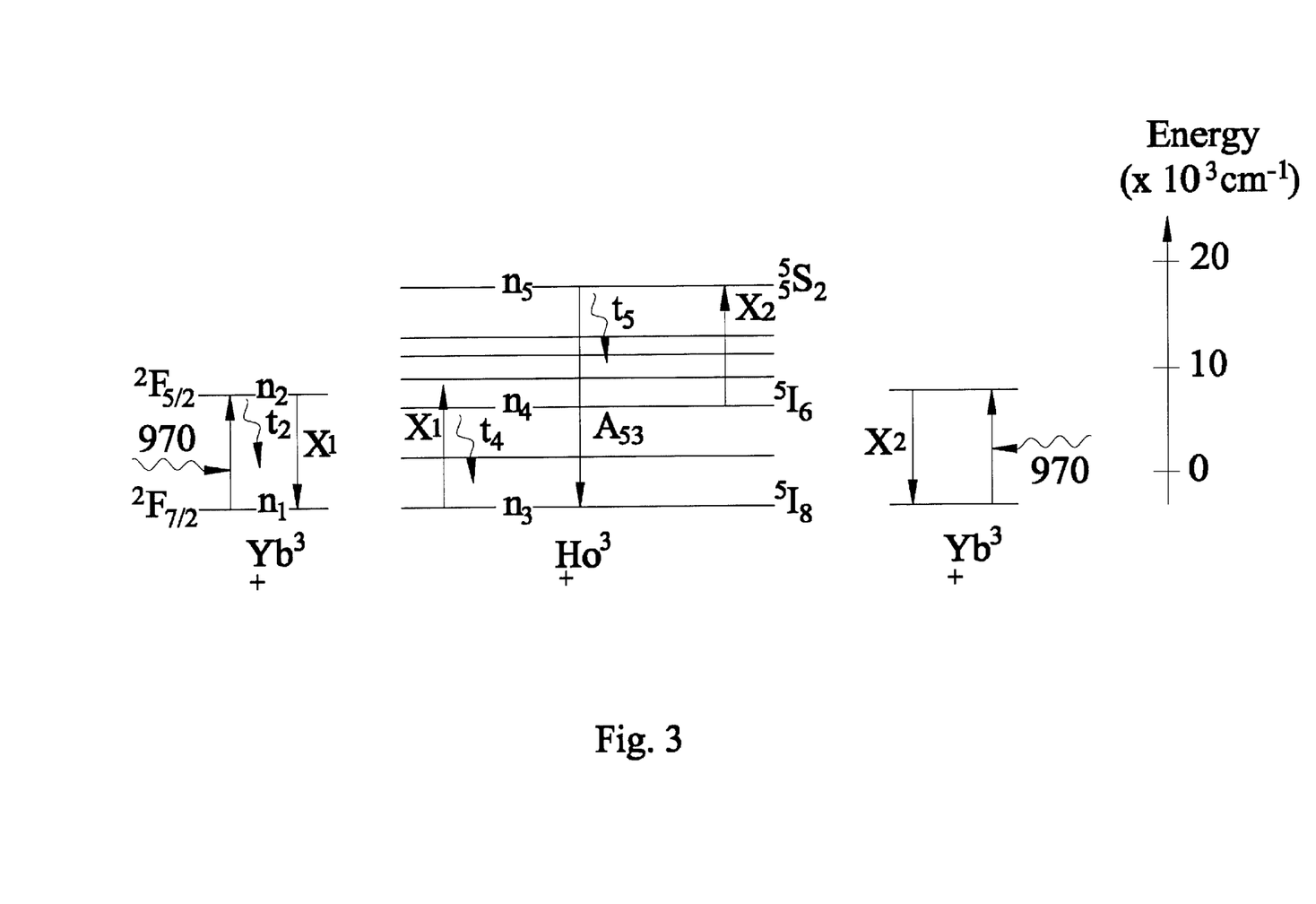
FIG. 3 is a coupled system energy diagram of ions (ytterbium plus visible emiiter) for holmium.

The energy diagram associated to our coupled system of ions (ytterbium plus visible emitter) is described in FIG. 3 for the case of holmium. Because the proper parameters are not yet available for our more efficient materials, we used values found in the literature for this particular material. The numerical values used were measured for a material designed to make a 2.9 $\mu$m laser. The quantitative values obtained for efficiencies should therefore be ignored. We are only evaluating the qualitative behaviors of the visible emission for various operating conditions. These behaviors will lead us to rules for the functioning of our displays that have been experimentally confirmed as seen below.

In order to better understand the mechanism of up-conversion, we first looked at the green visible emission after energy transfer from only two excited $Yb^{3+}$ ions as described in FIG. 3. The rate equations describing the dynamics of the coupled system of ions were written in Mathcad and are reported here in order to make the nomenclature used clearer for the reader.

$$\begin{cases} \dot{n}_1 = -\frac{\sigma_{abs}I_{pump}}{h\nu}(n_1 - n_2) + \frac{n_2}{\tau_2} + \chi_1 n_2 n_3 + \chi_2 n_2 n_4 \\ \dot{n}_2 = \frac{\sigma_{abs}I_{pump}}{h\nu}(n_1 - n_2) - \frac{n_2}{\tau_2} - \chi_1 n_2 n_3 - \chi_2 n_2 n_4 \\ \dot{n}_3 = -\chi_1 n_2 n_3 + \frac{n_4}{\tau_4} + \frac{n_5}{\tau_5} \\ \dot{n}_4 = \chi_1 n_2 n_3 - \frac{n_4}{\tau_4} - \chi_2 n_2 n_4 \\ \dot{n}_5 = \chi_2 n_2 n_4 - \frac{n_5}{\tau_5} \\ \dot{\phi} = A_{53} n_5 \end{cases} \quad (1)$$

In this set of equations, $n_i$ represents the population density in the state i, $\sigma_{abs}$ is the absorption cross-section of the material at the pump wavelength, $I_{pump}$ is the pump intensity, h is Planck constant and $\nu$ is the pump frequency. $\Phi$ is the photon emission rate in the visible and $A_{53}$ is the radiative decay rate of the transition 5 to 3. The system of equations was solved for various initial conditions and the numerical parameters used in the rate equations are listed in Table 2. In order to simplify further the problem, back transfer from the emitter to Yb was ignored in the model.

TABLE 2

Parameters used in the system of rate equations

| | | | |
|---|---|---|---|
| Lifetimes | Yb excited state | $\tau_2$ | 1.8 ms |
| | Ho intermediate $^5I_6$ state | $\tau_4$ | 3.5 ms |
| | Ho upper $^5S_2$, $^5F_4$ state | $\tau_5$ | 190 $\mu$s |
| Energy transfer coefficients | $^2F_{5/2}$ $^2F_{7/2}$ while $^5I_8$ $^5I_6$ | $\chi_1$ | $7 \times 10^{-18}$ cm$^3$/s |
| | $^2F_{5/2}$ $^2F_{7/2}$ while $^5I_6$ $^5S_2$, $^5F_4$ | $\chi_2$ | $3.1 \times 10^{-8}$ cm$^3$/s |
| Radiative decay rate | $^5S_2$, $^5F_4$ $^5I_8$ transition | $A_{53}$ | 3982 s$^{-1}$ |

Up-conversion System and Brightness and Efficiency Scaling Rules for Static Case First, the rate equations were solved in the case of equilibrium. This corresponds to a pump laser beam that does not scan the screen but that stands still on one point. As a result, we obtain a point source of visible light excited by a cheap near infrared laser diode.

Figure 4:
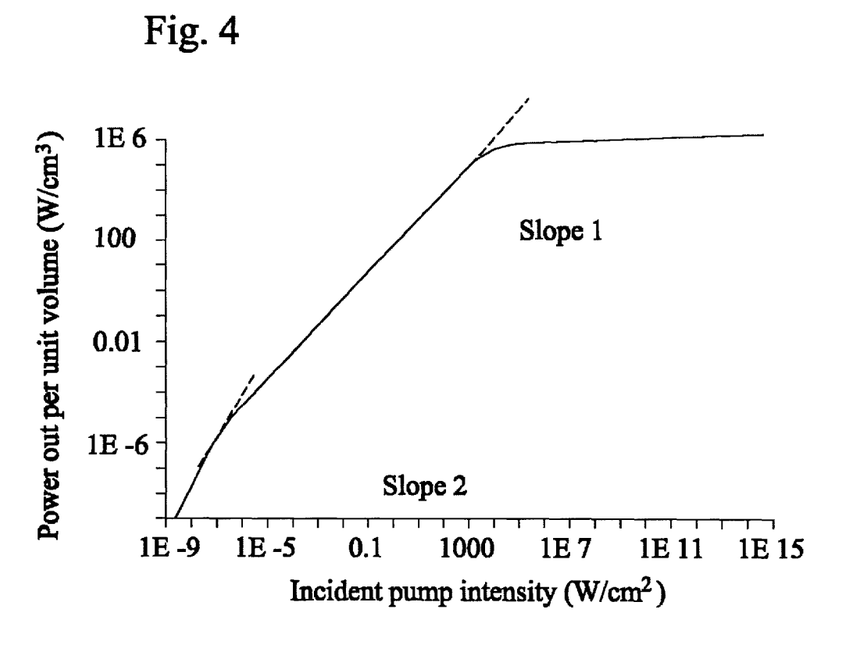
FIG. 4 is a log plot of power of visible light emitted versus infrared pump intensity.

The calculated power of visible light emitted per unit volume of material (directly related to brightness) versus the pump intensity is reported as a log-log plot in FIG. 4. We observe three regimes of operation: at low pump intensity the emission varies as the square of the pump intensity, then there is a significant pump intensity range in which the variation is linear. Finally, for very high pump intensities we reach saturation when the Yb population is nearly equal in both its states.

Figure 5:
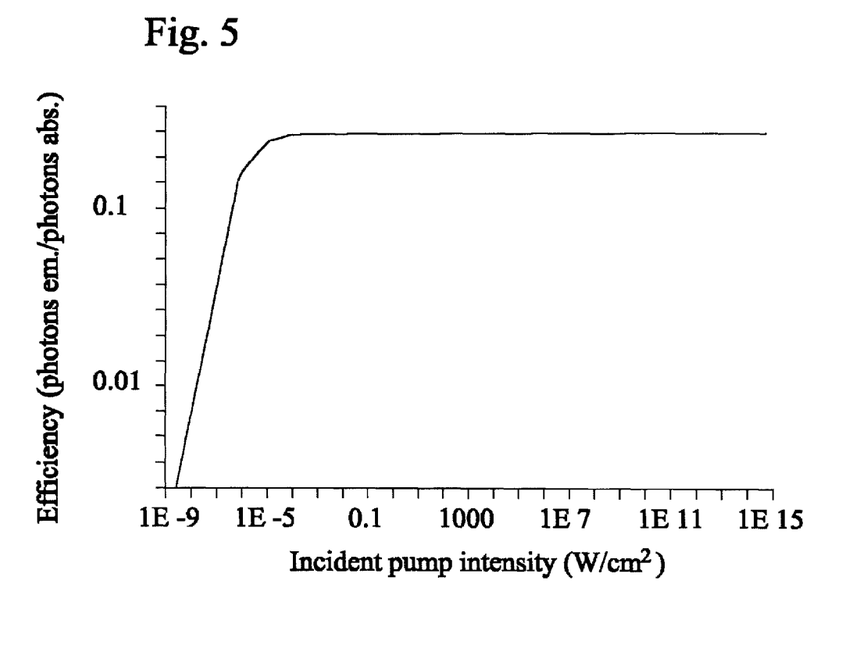
FIG. 5 is a graph of emission efficiency versus infrared pump intensity.

It is possible to calculate the efficiency of the system studied as defined by the ratio of the number of photons emitted to the number of pump photons absorbed per second per unit volume. As expected, we can see in FIG. 5 that it increases linearly at low intensity and reaches a maximum value when the emission becomes linear as a function of the pump intensity. Saturation is not evident here since when the Yb population is equal in both levels, it does no longer absorbs pump light. The rate with which pump photons are absorbed remains constant when the incident intensity is increased and so the efficiency remains constant.

Figure 6:
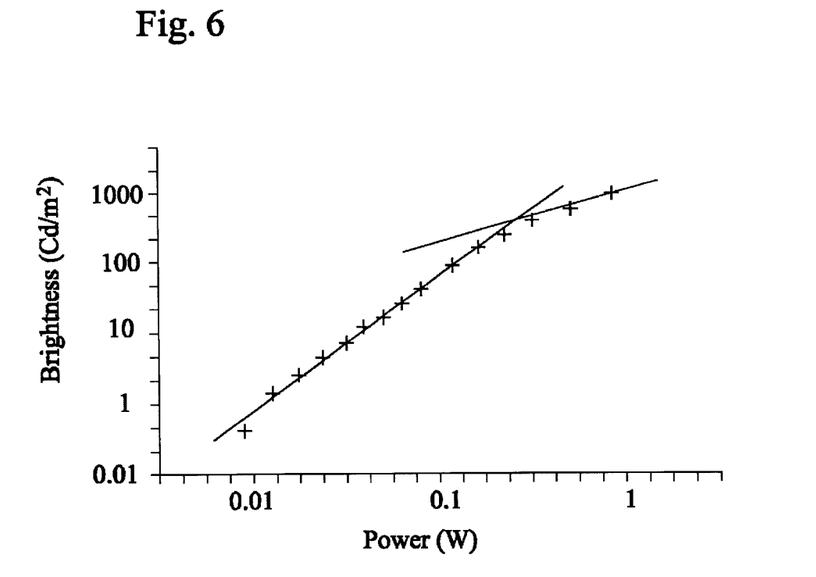
FIG. 6 is a graph of brightness at 545 nm measured for a sample of Er, Yb:NYF versus incident 968 nm pump power.

These results were tested experimentally for a sample of Yb, Er:NYF which also emits in the green after energy transfer from two Yb ions. The quadratic and linear regimes were observed and are plotted in FIG. 6. The limit between the two regimes in this material occurs for a luminance of about 250 Cd/m². We never attained saturation even for brightnesses greater than 50 kCd/m². The agreement with the model gives us confidence in saying that we can increase the efficiency of our materials by simply focusing the pump light to smaller spots until we reach a given value of luminance (fixed by parameters intrinsic to the material). The efficiency will then remain constant whether the focus spot is reduced further or the pump power is increased.

We can formalize the expressions for brightness and efficiency in the quadratic regime of the material. The brightness and the infrared pump power P and diameter d are related as follows:

$$B \propto \frac{P^2}{d^4} \quad (2)$$

The efficiency can be written as:

$$\text{Efficiency} \propto \frac{P}{d^2} \quad (3)$$

Up-conversion System and Brightness and Efficiency Scaling Rules for Dynamic Case The system of rate equations was then solved after excitation by a pump pulse having the following time dependence between t=0 and t=T:

$$I = I_0 \left( \cos\left(\frac{2\pi t}{T} + \pi\right) + 1 \right) \quad (4)$$

Figure 7:
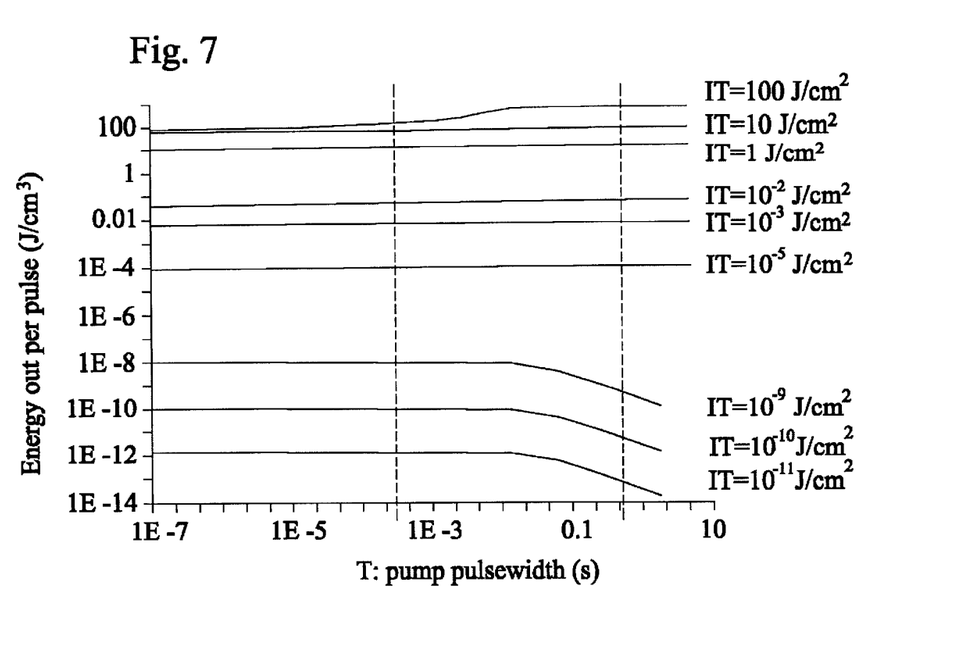
FIG. 7 shows energy of visible light emitted per unit volume versus pump pulse length for various pump exposures.

This also represents the case in which a laser beam is scanned over a screen with a dwell time of T on each point. The energy emitted per unit volume was calculated for varying pulse lengths T but constant pump exposures (product of pump intensity $I_0$ by pump length T). The result of the calculations is shown in FIG. 7.

Several observations can be made from this plot. First, for pump pulse lengths smaller than the Yb excited state lifetime, the emitted light energy depends only on the total exposure even for very short pulses. This is due to the fact that Yb ions absorb the pump photons at a rate proportional to the pump intensity, then in effect store this energy while transferring to the emitters. Likewise, the decrease in output energy for longer pulse lengths at low exposure is most likely due to loss of stored energy through decay of the Yb excited state population. For the highest pump exposure (100 J/cm²), we observe a decrease of output energy for the shorter pulses. This corresponds to higher pump intensities and we then reach saturation, when the populations in both states of Yb become equal.

Figure 8:
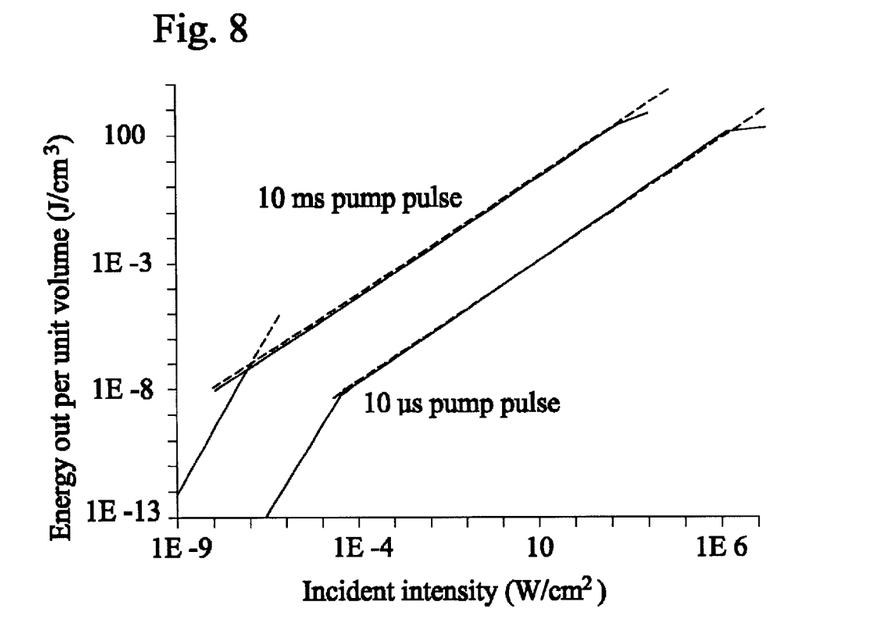
FIG. 8 shows energy of visible light emitted per unit volume versus incident pump intensity for 2 pulse lengths.

We can also plot these results for a fixed pump pulse length and varying incident intensities (FIG. 8). As in the static case, three regimes can be observed: quadratic, linear and saturation for very high pump intensity. It is interesting to note that the limit between the different regimes occurs for a fixed brightness level, not fixed pump intensity.

Figure 9:
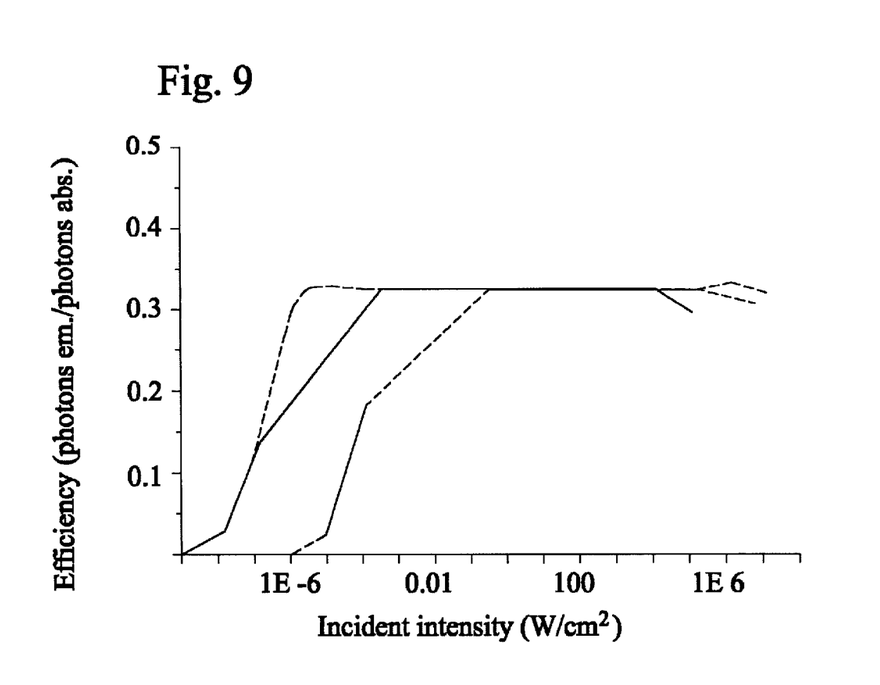
FIG. 9 shows emission efficiency versus infrared pump intensity for 10 ms dwell time(solid bold curve), 10 $\mu$s dwell time(dashed bold curve) and static case (thin dashed curve).

As for the static case, it is possible to calculate the efficiency as defined by the ratio of the number of photons emitted per pulse and per unit volume of material divided by the number of pump photons absorbed per pulse and per unit volume of material. The efficiencies for two different dwell times are plotted in FIG. 9 along with the efficiency obtained in the static case. We see from this plot that increasing the pump intensity yields better efficiencies until it reaches its maximum. This maximum occurs at higher intensities for shorter pump dwell times.

Experiments conducted on a Yb, Er:NYF sample showed that the brightness of the green emission was indeed a quadratic function of the incident beam intensity in the range of intensities available at this time. This gives us confidence for deriving new scaling laws for the case of a scanned laser pump beam in the quadratic regime.

Assuming a single diode laser of output power P focussed to a spot of diameter d, used to scan a total length L with a repetition rate RepRate, we obtain that the brightness of the screen goes as:

$$B \propto \left(\frac{P}{d^2} \frac{d}{L \, RepRate}\right)^2 RepRate = \frac{P^2}{d^2 L^2 RepRate} \quad (5)$$

This corresponds to an efficiency that goes as:

$$\text{Efficiency} \propto \frac{P}{dL \, RepRate} \quad (6)$$

Once again, for the brightness levels desired in a regular display, we will be working in the quadratic regime of our material. We can therefore predict that the efficiency will be increased by focussing the pump beam to a smaller spot. It can be noted that this study concerns processes in which two energy transfers from Yb are involved. The effect of the pump intensity (power and diameter) on the blue emission from other dopant ions should be even stronger, as the process involves energy transfer from three Yb ions.

Figure 10:
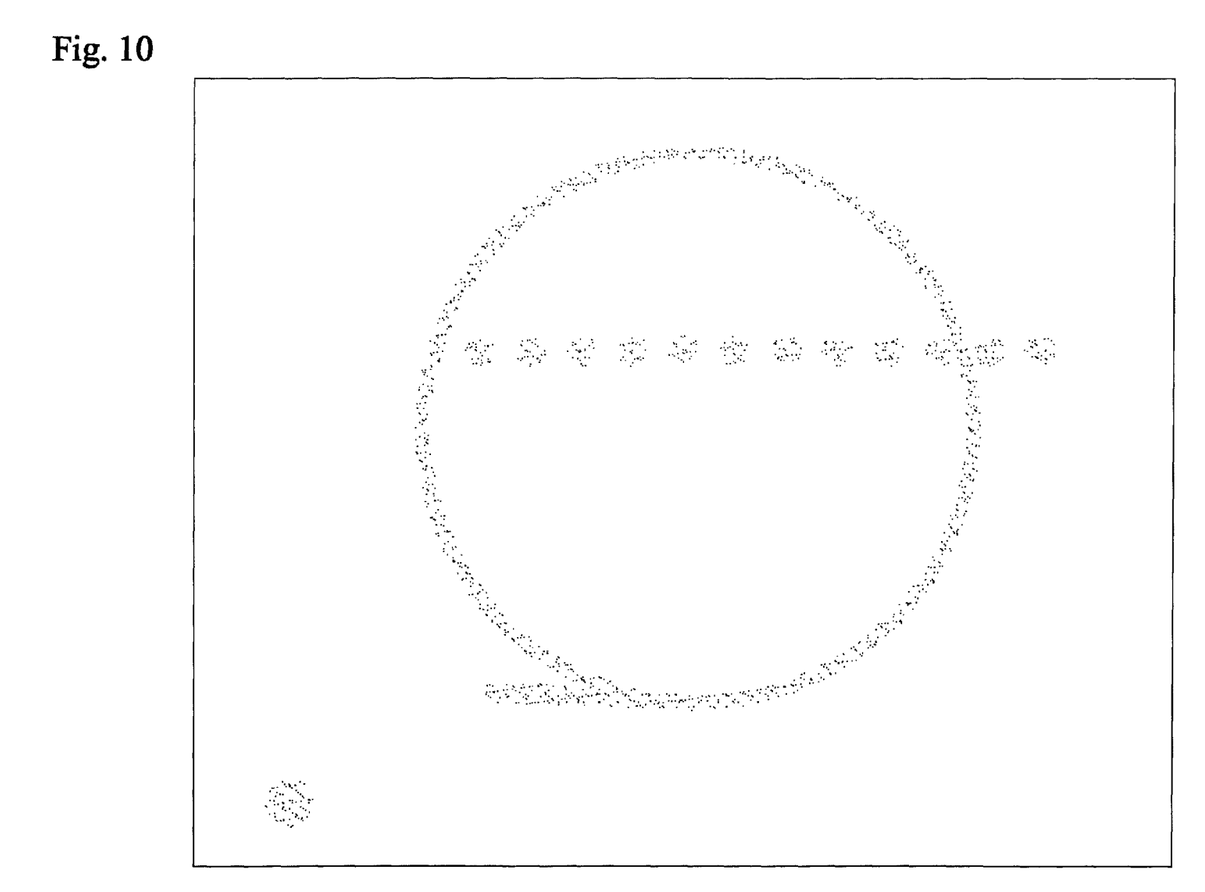
FIG. 10 shows an image of the one dimensional display using Er, Yb:NYF in p-PMMA.

FIG. 10 is a photo of a single line of spots from a demonstration display employing crystallites of the same medium as in FIG. 2c but dispersed in p-PMMA at approximately 20% concentration by weight. The crystallites were approximately 10 μm in diameter and the display medium was composed of several layers (approximately 8 layers, each being approximately 56 microns thick) totaling approximately 600 μm in thickness. As shown good uniformity was obtained. The layers were deposited on a glass microscope slide to provide physical support.

Referring to FIG. 10 a mirror was affixed to the front side of the microscope slide to reflect the scanned and modulated diode laser light for a second pass through the display medium and to prevent laser light from entering the camera's lens or the observer's eye. The excitation source power incident on the display medium in FIG. 10 was less than approximately 1 W and the display was easily visible in a brightly lighted room. The pump light was focused to a spot of approximately 500 μm in diameter and was scanned at approximately 1200 cm/sec across the display medium.

From data such as described for FIG. 10 we can predict that a high resolution display based on the reported concept and which is 100×60 cm can be prepared and operated with only approximately 70 W of diode pump power. The red, green and blue emitters would have to be physically separated as they are in current CRT displays. Diode laser light with sufficient power can be obtained right now from diode laser bars with fiber optic beam combiners. If emitters producing only a single wavelength in the visible can not be found or are not as efficient as those we report, the full color display will require filters in the screen location of certain emitters so that the observer sees only one emission wavelength. This is currently done in liquid crystal displays. In other words, several of the basic technologies required to produce a useful display based on the subject invention already exist. Research on improved emitters, beam handling and focusing optics, and optical scanners can further demonstrate prototype displays.

Combinations of Emitters with Special Optics for Large Displays

Dispersed crystallite up conversion displays employing diode laser excited materials places at the focus of light collecting and collimating optics to illuminate a large area (for example a dimension of several centimeters) as in "Jumbotron" type displays.

Dispersed crystallite up conversion display mediums can be placed at the focus of a parabolic reflector to obtain a collimated beam of light. This light can be directed to a diffusing screen to serve as an element in large displays such as "Jumbotron" displays used in environments such as sports arenas. Specially designed optical surfaces and mirrors to collect all the emitted light can be accomplished with the subject invention. Still furthermore, the invention can be used for indicator lighting, signaling devices, illumination systems, and the like.

The dispersed crystallite up conversion display (DCUCD) concept described in this invention can also be applied to the problem of true 3D(three dimensional) displays. In a 3D display, to obtain volumetric selectivity a phenomenon is sought in which visible light is emitted only when two different excitations are present. By selecting materials that can simultaneously absorb two different near infrared photons and then emit visible light, e.g. dye doped polymer particles, we have shown the potential for making true 3D displays. The invention uses crystalline systems that allow for such processes since dispersing crystallites within the volume of a polymeric passive host allows for 3D displays of practical size.

Figure 11A:
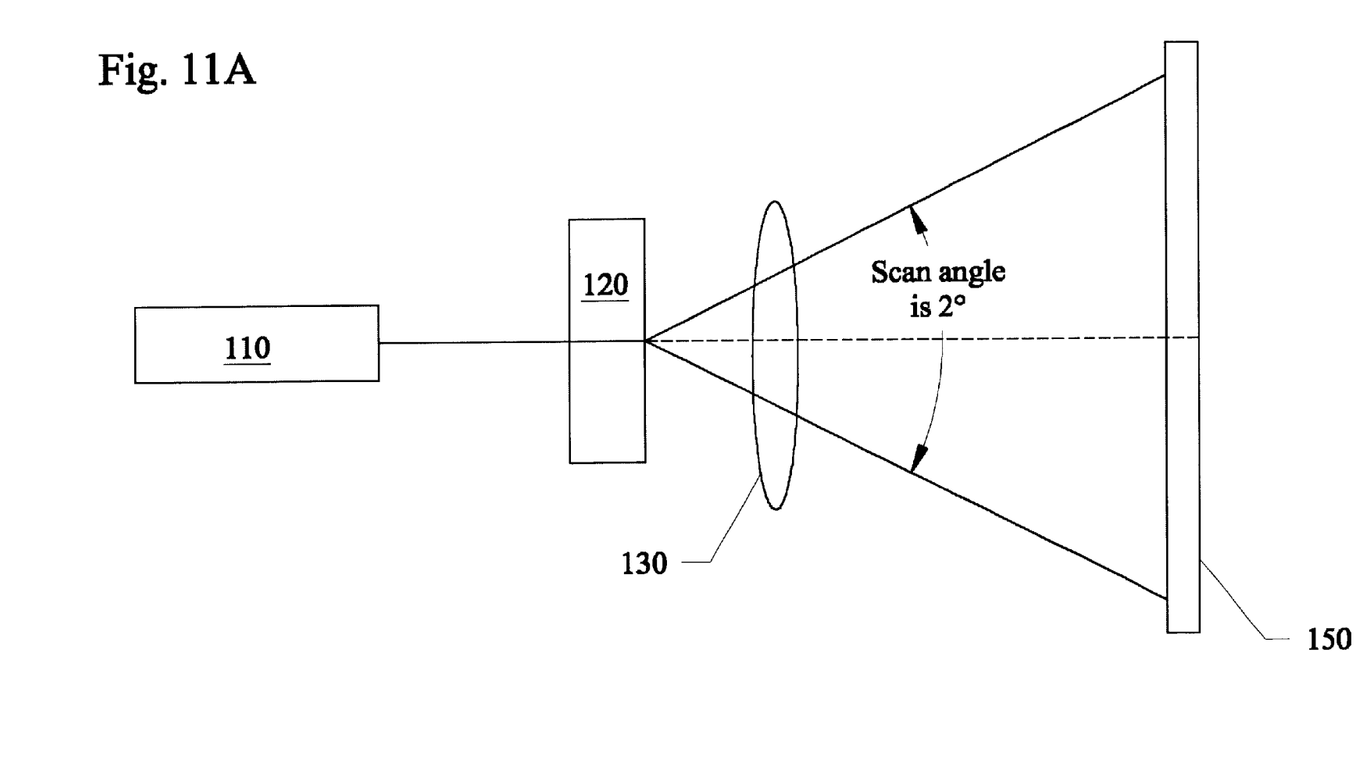
FIG. 11A shows another embodiment of the invention, with the axis of the laser and scanner system being normal to the plane of the display system.
Figure 11B:
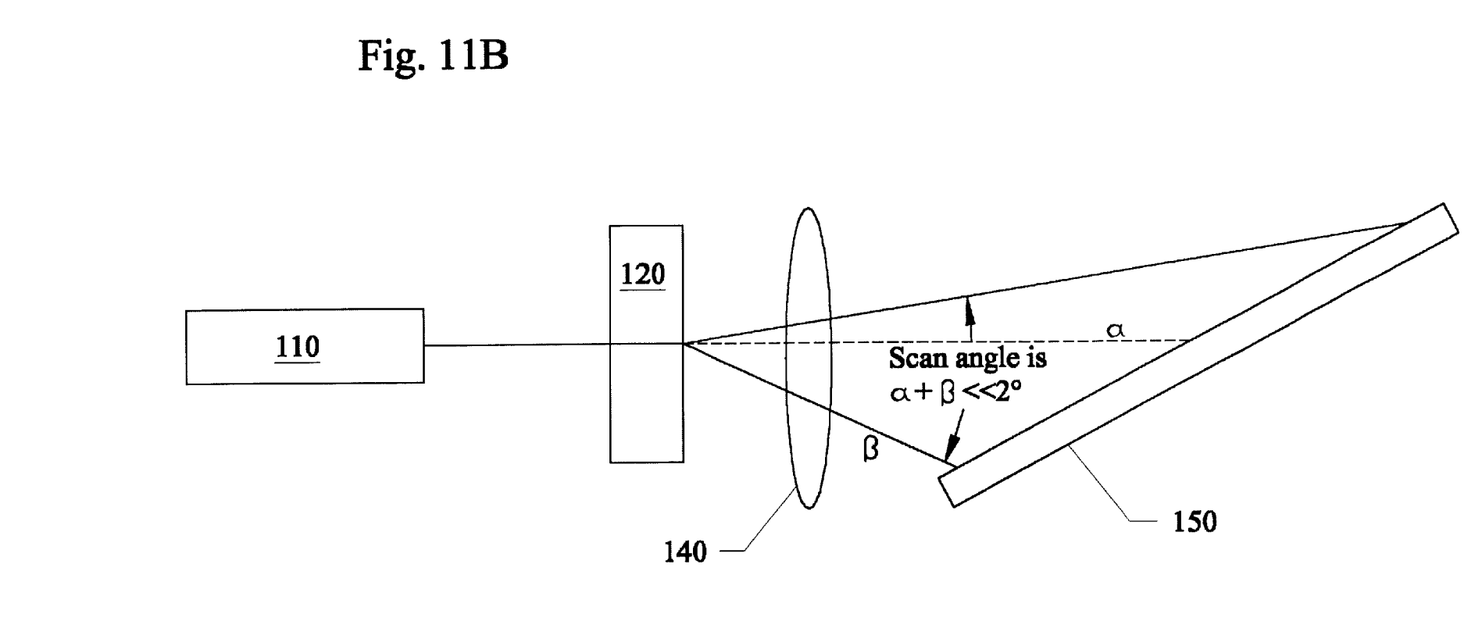
FIG. 11B shows the embodiment of FIG. 11A with the axis of the laser and scanner system being tilted with respect to the plane of the display surface.

FIG. 4A shows another embodiment 100 of the invention, with the axis of the laser and scanner system being normal to the plane of the display system. FIG. 4B shows the embodiment 100 of FIG. 4A with the axis of the laser and scanner system being tilted with respect to the plane of the display surface.

An optically written displays such as those described above in which the angle between the axis of the scanning beam or beams of light are selected to minimize the angular scan range demanded of the beam scanning system. For the displays, the choice of angles is made and in which specially designed optics in included to assure that the size of the irradiated resolution element is constant, or sufficiently constant, on the entire display screen to assure uniform display brightness. Tilting about both axis achieves the desirable angular scan range reduction for both dimensions of the display surface.

The labeled components for laser 110, scanner 120, beam focussing optics 130 and 140, display medium 150 correspond to like titled components of FIG. 1. Furthermore, the function of these components is similar those components in FIG. 1 with some additions. The tilt of the display surface 150 with respect to the axis of the diode laser system 110 requires the scanner 120 to scan a smaller angular range with optics formed to produce the selected spot size on the display medium 150 at the now varying distance from the lens center. The optics 130/140 can be further optimized with the use of off-the-shelf software such as but not limited to Code V, ASAP, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of displaying color images from a display medium, comprising the steps of:

generating a first light beam;

absorbing a portion of the first light beam in a display medium of a transparent polymer plastic containing particles doped with rare earth ions, the particles having sizes between approximately 1 to approximately 100 microns; and emitting visible color light from the display medium.

2. The method of claim 1, wherein the step of generating further includes:

operating a laser at approximately 900 to approximately 1100 nm.

3. The method of claim 1, wherein the transparent polymer plastic includes:

phosphorylated polymethylmethacrylate(p-PPMA).

4. The method of claim 1, wherein each of the particles include:

sizes of approximately 10 $\mu$m.

5. The method of claim 2, wherein each of the particles include:

rare earth ions co-doped with $YB^{3+}$ in fluoride and orthophosphate crystalline hosts.

6. The method of claim 5, wherein the doping ion further includes:

Tm.

7. The method of claim 5, wherein the doping ion further includes:

Er.

8. The method of claim 5, wherein the doping ion further includes:

Ho.

9. The method of claim 5, wherein the crystalline hosts include:

$NaYF_4$.

10. The method of claim 5, wherein the crystalline hosts include:

KYF.

11. The method of claim 5, wherein the crystalline hosts include:

YLF.

12. The method of claim 5, wherein the crystalline hosts include:

$LuPO_4$.

13. The method of claim 1, wherein the visible color light include colors chosen from at least one of: blue, green and red.

14. A display medium, comprising:

a transparent polymer plastic; and particles dispersed in the plastic for up-converting infrared light to visible light, the particles having sizes between approximately 1 to approximately 100 microns, wherein the particles in the plastic are used to form visible displays.

15. The display medium of claim 14, wherein the transparent polymer plastic includes:

phosphorylated polymethylmethacrylate(p-PPMA).

16. The display medium of claim 14, wherein each of the particles include: sizes of approximately 10 $\mu$m.

17. The display medium of claim 14, wherein each of the particles include: rare earth ions co-doped with $Yb^{3+}$ in fluoride and orthophosphate crystalline hosts.

18. The display medium of claim 17, wherein the doping ion further includes:

Tm.

19. The display medium of claim 17, wherein the doping ion further includes:

Er.

20. The display medium of claim 17, wherein the doping ion further includes:

Ho.

21. The display medium of claim 17, wherein the crystalline hosts include:

$NaYF_4$.

22. The display medium of claim 17, wherein the crystalline hosts include:

KYF.

23. The display medium of claim 17, wherein the crystalline hosts niclude:

YLF.

24. The display medium of claim 17, wherein the crystalline hosts include:

$LuPO_4$.

25. The display medium of claim 15, wherein the visible color light include colors chosen from at least one of: blue, green and red.

26. A method of displaying color images from a display medium, comprising the steps of:

dispersing particles in a plastic host medium;

generating an infrared light beam into the host medium;

absorbing a portion of the infrared light beam in the dispersed particles;

upconverting a portion of the infrared light beam into visible colored light; and emitting blue visible colored light with fluoride crystal host, $NaYF_4$ particles co-doped with $Tm^{3-}$ ions at approximately 480 nm.

27. A method of displaying color images from a display medium, comprising the steps of:

dispersing particles in a plastic host medium;

generating an infrared light beam into the host medium;

absorbing a portion of the infrared light beam in the dispersed particles;

upconverting a portion of the infrared light beam into visible colored light; and emitting green visible colored light with fluoride crystal host, $NaYF_4$ particles co-doped with ions chosen from one of $Ho^{3+}$ or $Er^{3+}$ ions, at approximately 550 nm.

28. A method of displaying color images from a display medium, comprising the steps of:

dispersing particles in a plastic host medium;

generating an infrared light beam into the host medium;

absorbing a portion of the infrared light beam in the dispersed particles;

upconverting a portion of the infrared light beam into visible colored light; and emitting red visible colored light with fluoride crystal host, $NaYF_4$ paraticles co-doped with $Er^{3+}$ ions at approximately 660 nm.

29. A method of displaying color images from a display medium, comprising the steps of:

generating a first light beam;

absorbing a portion of the first light beam in a display medium of a transparent polymer plastic of phosphorylated polymethylmethacrylate(p-PPMA) containing particloes doped with rare earth ions; and emitting visible color light from the display medium.

30. A method of displaying color images from a display medium, comprising the steps of:

generating a first light beam;

absorbing a portion of the first light beam in a display medium of a transparent polymer plastic containing particles doped with rare earth ions, wherein each of the particles include rare earth ions co-doped with $Yb^{3+}$ in fluoride and orthophosphate crystalline hosts; and emitting visible color light from the display medium.

31. A display medium, comprising:

a transparent polymer plastic of phosphorylated polymethylmethacrylate(p-PPMA); and means dispersed in the plastic for up-converting infrared light to visible light, wherein the dispersed means in the plastic is used to form visible displays.

32. A display medium, comprising:

a transparent polymer plastic; and particles in the plastic for up-converting infrared light to visible light, the particles including rare earth ions co-doped with $Yb^{3-}$ in fluoride and orthophosphate crystalline hosts, wherein the particles in the plastic are used to form visible displays.

* * * * *